United States Patent
Garety et al.

(10) Patent No.: US 8,356,806 B2
(45) Date of Patent: Jan. 22, 2013

(54) MAIN RUBBER ELEMENT FOR HYDRAULIC ENGINE MOUNTS

(75) Inventors: John Garety, South Haven, MI (US); Eric Hughes, Kalamazoo, MI (US); Troy Molesworth, South Haven, MI (US)

(73) Assignee: Trelleborg Automotive USA, Inc., South Haven, MI (US)

( * ) Notice: Subject to any disclaimer, the term of this patent is extended or adjusted under 35 U.S.C. 154(b) by 238 days.

(21) Appl. No.: 12/787,603

(22) Filed: May 26, 2010

(65) Prior Publication Data

US 2010/0301529 A1 Dec. 2, 2010

Related U.S. Application Data

(60) Provisional application No. 61/181,039, filed on May 26, 2009.

(51) Int. Cl.
*F16M 5/00* (2006.01)
*F16F 5/00* (2006.01)

(52) U.S. Cl. .................................... 267/140.13

(58) Field of Classification Search ............. 267/140.13, 267/140.14, 140.15; 248/562, 636
See application file for complete search history.

(56) References Cited

U.S. PATENT DOCUMENTS

| | | | |
|---|---|---|---|
| 4,399,987 A | 8/1983 | Cucelli et al. | |
| 4,621,795 A | 11/1986 | Eberhard et al. | |
| 4,657,232 A * | 4/1987 | West | 267/140.13 |
| 4,679,777 A | 7/1987 | Gold et al. | |
| 4,681,306 A | 7/1987 | Hofmann et al. | |
| 4,712,777 A * | 12/1987 | Miller | 267/140.13 |
| 4,753,422 A * | 6/1988 | Thorn | 267/140.13 |
| 4,757,982 A | 7/1988 | Andra et al. | |
| 4,773,634 A | 9/1988 | Hamaekers | |
| 4,903,951 A | 2/1990 | Miyamoto et al. | |
| 4,997,169 A | 3/1991 | Nakamura et al. | |
| 5,316,275 A | 5/1994 | Maeno et al. | |
| 5,571,263 A | 11/1996 | Koester et al. | |
| 6,357,731 B1 * | 3/2002 | Tanahashi | 267/140.13 |
| 6,491,290 B2 * | 12/2002 | Muramatsu et al. | 267/140.14 |
| 7,063,191 B2 * | 6/2006 | Hopkins et al. | 267/140.14 |
| 2002/0109280 A1 * | 8/2002 | Baudendistel et al. | 267/140.15 |

FOREIGN PATENT DOCUMENTS

JP 2005249063 A 9/2005
KR 100846038 B1 7/2008

\* cited by examiner

*Primary Examiner* — Thomas J Williams
(74) *Attorney, Agent, or Firm* — Gifford, Krass, Sprinkle, Anderson & Citkowski, P.C.

(57) ABSTRACT

An improved hydraulic engine mount includes a main rubber element of one piece construction. The main rubber element includes an upper portion, an intermediate portion, and a lower portion. The lower portion includes an interlocking seal portion. The hydraulic engine mount includes an upper housing and a lower housing. The interlocking seal portion includes an upper protrusion operable to fit within an upper groove of the upper housing to fit together to form a tight locking seal. The upper housing further includes an upper protrusion operable to connect to an upper groove of the main rubber element. The upper groove of the main rubber element is annular and extends around the lower portion of the main rubber element. The lower portion of the main rubber element further includes a generally axially extending second protrusion abutting both the upper housing and the lower housing. The lower housing includes a protrusion abutting a second protrusion of the main rubber element and fitting within a second groove of the main rubber element. A third protrusion of the main rubber element abuts the protrusion of the lower housing, a top plate of an inertia track assembly, and defines the lower section of an upper chamber. Additionally, a sealing bead is molded to the bottom of the main rubber element to seal against the top of the inertia track.

16 Claims, 2 Drawing Sheets

MAIN RUBBER ELEMENT FOR HYDRAULIC ENGINE MOUNTS

CROSS-REFERENCE TO RELATED APPLICATIONS

This application claims priority of U.S. Provisional Patent Application Ser. No. 61/181,039 filed May 26, 2009, which is incorporated herein by reference.

FIELD OF THE INVENTION

This invention relates generally to engine mounts. More particularly, this invention relates to a hydraulic engine mount having a main rubber element.

BACKGROUND OF THE INVENTION

Hydraulic engine mounts are used to position an engine and to control the gross motion of the engine within a vehicle. The hydraulic engine mount also provides damping to absorb energy created by the moving engine by a large amplitude excitation (±1.0 millimeter) and to provide isolation so that vibration of an engine does not transfer to the vehicle structure by small amplitude excitation (±0.1 millimeter). As shown in FIG. 1, previously known engine mounts include an upper mounted housing and a lower housing. A threaded stud for mounting the engine extends from the top of the housing. The threaded stud is inserted into a threaded aperture of a core. The core is molded to a main rubber element, thereby defining a main component of the main rubber element. The main rubber element is formed by the upper core, highly elastic rubber, and the outer, all separate and distinct and later molded together. The outer ring rests on top of the lower housing. When the top of the mount is moved due to large amplitude excitation of the engine, the fluid in the inertia track is pumped back and forth from the upper chamber to the lower chamber through the inertia track. The size of the inertia track is tuned so that the fluid in the track will provide maximum damping at a particular frequency determined by the application. The highly elastic rubber, along with a decoupler, contributes to good isolation characteristics. The decoupler is a rubber disk that is captured between the top and bottom inertia track planes. The disk provides compliance as the fluid in the working chamber acts upon it, thus keeping the pressure from building up in the walls of the main rubber element, keeping the mount stiffness low.

The hydraulic engine mount is usually made with a softer rubber compared to conventional engine mounts to thereby provide good isolation at low amplitude (idle, smooth road) and the fluid in the upper chamber provides damping at the high amplitude situations (speed bumps, potholes, and shifting gears).

The outer ring rests on top of the lower housing and provides a seal to prevent fluid from escaping from the upper chamber, the lower chamber or outside of the hydraulic engine mount. Traditionally, the main rubber element and the outer ring are separate and distinct elements. The outer ring requires extensive pre-installation procedures including cleaning, pretreatments, and coatings with special adhesives. Additionally, the outer ring increases complication of assembly to ensure the outer ring is properly sealed. Accordingly, it is advantageous to provide an improved outer ring or an improved main rubber element having improved sealing features as well as simplified installation procedures.

SUMMARY OF THE INVENTION

An improved hydraulic engine mount includes a main rubber element of one piece construction. The main rubber element includes an upper portion, an intermediate portion, and a lower portion. The lower portion includes an interlocking seal portion. The hydraulic engine mount includes an upper housing and a lower housing. The interlocking seal portion includes an upper protrusion operable to fit within an upper groove of the upper housing to fit together to form a tight locking seal. The upper housing further includes an upper protrusion operable to connect to an upper groove of the main rubber element. The upper groove of the main rubber element is annular and extends around the lower portion of the main rubber element. The lower portion of the main rubber element further includes a generally axially extending second protrusion abutting both the upper housing and the lower housing. The lower housing includes a protrusion abutting a second protrusion of the main rubber element and fitting within a second groove of the main rubber element. A third protrusion of the main rubber element abuts the protrusion of the lower housing, a top plate of an inertia track assembly, and defines the lower section of an upper chamber. Additionally, a sealing bead is molded to the bottom of the main rubber element to seal against the top of the inertia track. The grooves and protrusions of the main rubber element define the elements of the interlocking seal and provide improved sealing characteristics as well as increased ease of installation.

BRIEF DESCRIPTION OF THE DRAWINGS

The above and other features and objects of the invention will be better understood from the following detailed description of the typical embodiments illustrated in the accompanying drawings, in which.

DETAILED DESCRIPTION OF THE PREFERRED EMBODIMENTS

An improved hydraulic engine mount includes a main rubber element of one piece construction. The main rubber element includes an upper portion, an intermediate portion, and a lower portion. The lower portion includes an interlocking seal portion. The hydraulic engine mount includes an upper housing and a lower housing.

Figure 1:
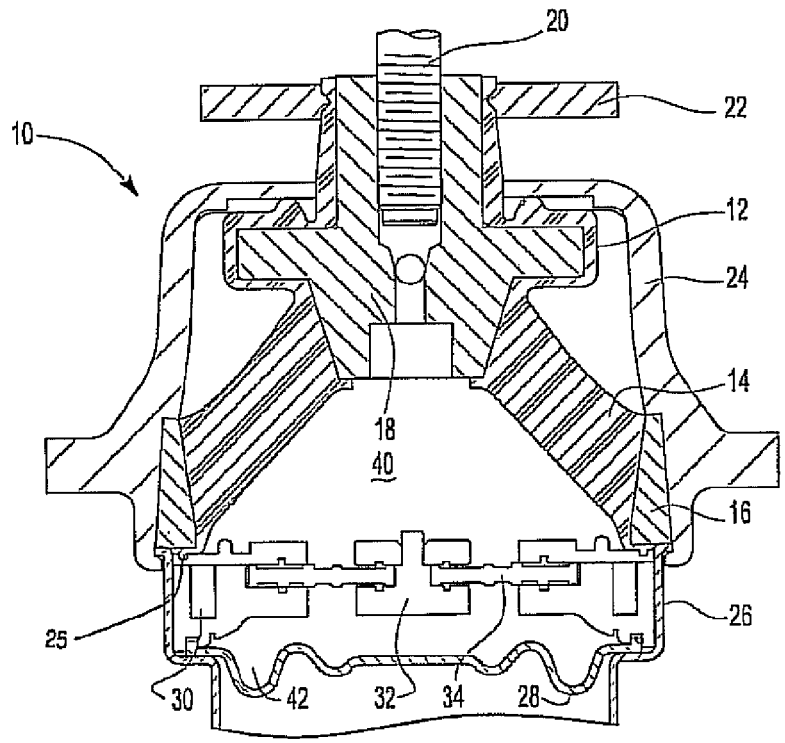
FIG. 1 is a cross-sectional view of the prior art.

Previously known hydraulic engine mounts 10 include an upper housing 24 mounted to a lower housing 26, as shown in FIG. 1. A threaded stud 20 for mounting the engine extends from the top of the hydraulic engine mount. A rubber bumper 22 is provided at the top of the hydraulic engine mount for further support a mounted engine. The threaded stud 20 is inserted into a threaded aperture of a core 18 of the main rubber element 12. The main rubber element 12 includes the core 18 and the outer ring 16. The main rubber element 12 is made of a highly elastic rubber. The outer ring 16 rests on top of the lower housing 26.

The outer ring 16 rests on top of the lower housing 26. The outer ring 16 and the sealing bead 25 create a seal to prevent fluid from escaping from an upper chamber 40, from a lower chamber 42 and keeping fluid from escaping outside of the hydraulic engine mount. Traditionally, the main rubber element 12 and the outer ring 16 are separate and distinct elements, and later molded together. When the top of the hydraulic engine mount 10 is moved due to large amplitude excitation of the engine, the fluid in the inertia track 30 is pumped back and forth from the upper chamber 40 to the lower chamber 42 through the inertia track 30. The inertia track 30 provides an opening allowing fluid from lower chamber 42 into upper chamber 40. The inertial track 30 further includes a second opening allowing fluid to leave upper chamber 40 and enter lower chamber 42. The size of the inertia track 30 is tuned so that the fluid in the inertia track 30 will provide maximum damping at a particular frequency determined by the application. A highly elastic rubber, along with a decoupler 34, contributes to good isolation characteristics. The decoupler 34 is a rubber disk that is captured between the top and bottom inertia track planes. The decoupler 34 provides compliance as the fluid in the upper chamber 40 acts upon it, thus keeping the pressure from building up in the walls of the main rubber element, keeping the mount stiffness low.

Figure 2:
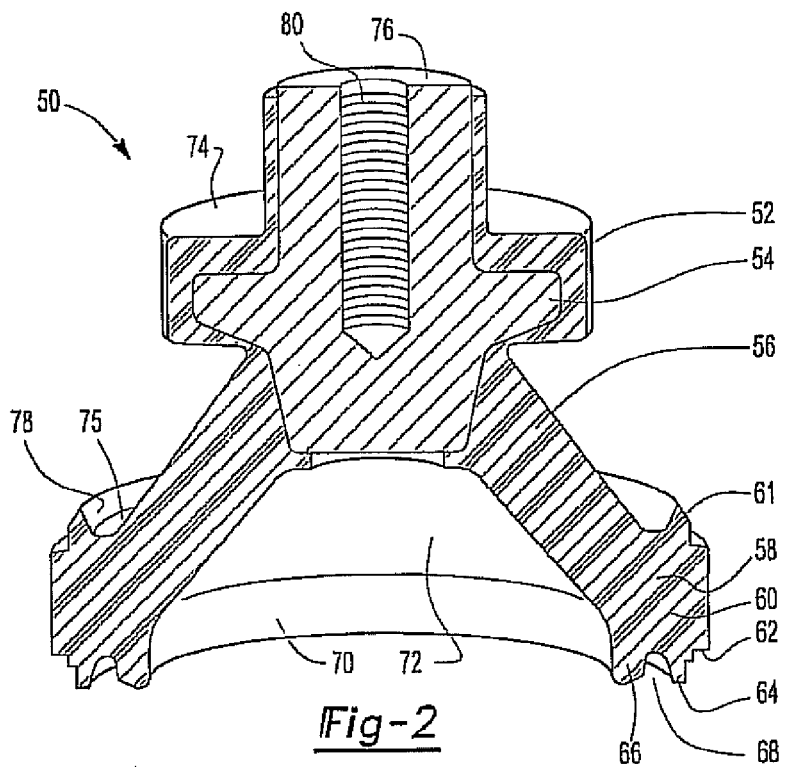
FIG. 2 is a perspective cross-sectional view of the improved main rubber element.
Figure 3:
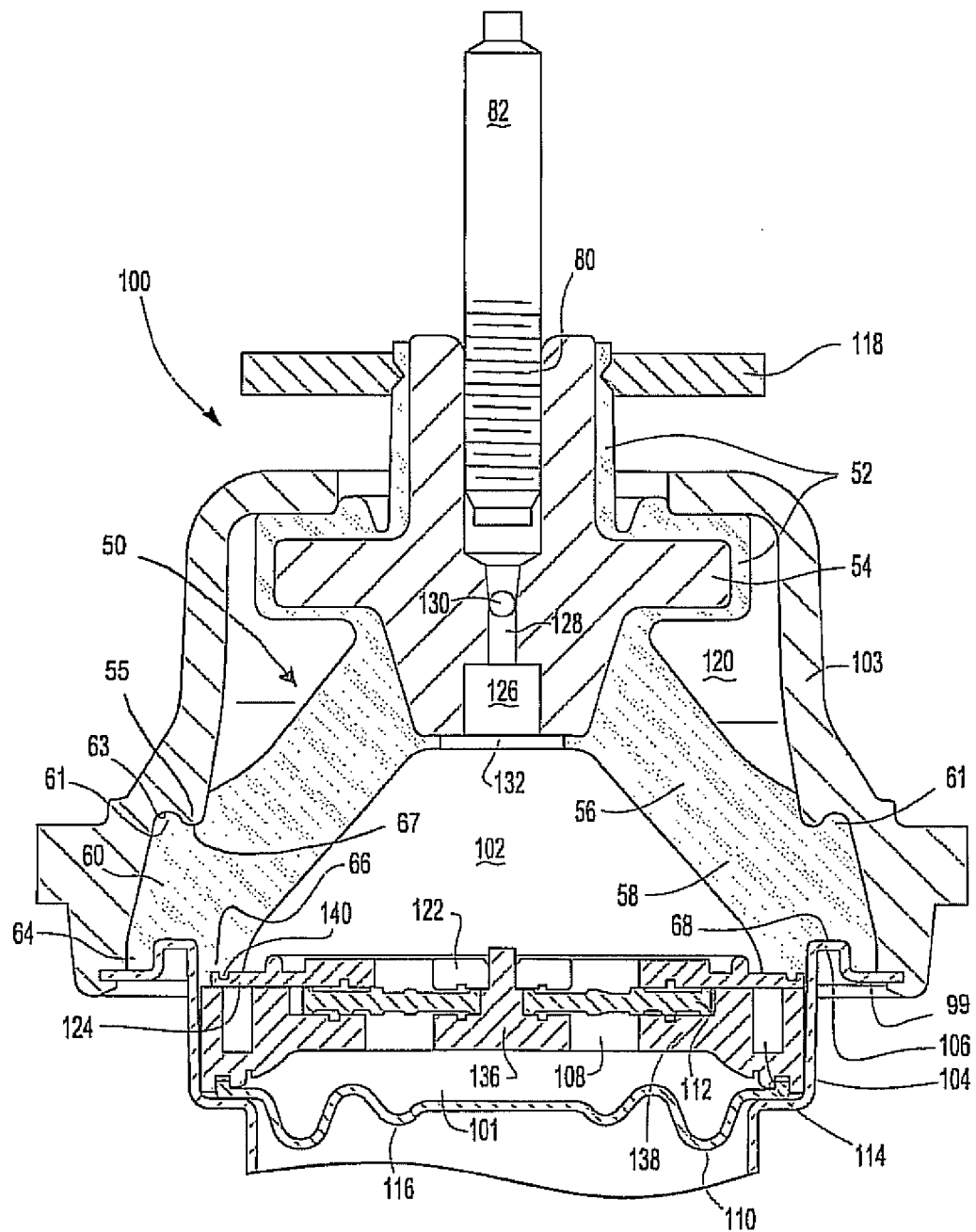
FIG. 3 is a cross-sectional view of an assembled hydraulic engine mount having an improved one piece main rubber element.

Referring now to FIGS. 2 and 3, a hydraulic engine mount assembly 100 includes a main rubber element 50, an upper housing 103, and a lower housing 104. The main rubber element 50 includes an upper portion 52, an intermediate portion 56, and a lower portion 58. The lower portion 58 includes an interlocking seal 60.

The main rubber element 50 further includes a core 54. The main rubber element 50 is molded to the core 54. The core 54 of the main rubber element 50 includes a threaded aperture 80 operable to accept a threaded stud 82. An engine mounts to the hydraulic engine mount 100 by means of the threaded stud 82 and the threaded aperture 80. The threaded stud 82 extends from the top of the core 76. Alternatively, the threaded stud 82 for mounting the engine extends from the top of the hydraulic engine mount. A rubber bumper 118 is provided at the top of the hydraulic engine mount for further support a mounted engine.

The main rubber element 50 includes the lower portion 58 including the interlocking seal portion 60. The interlocking seal portion 60 includes a protrusion 61 operable to fit within the groove 63 of the upper housing 103. The groove 63 and the protrusion 61 fit together to form a tight locking seal. The upper housing 103 further includes a protrusion 55 operable to connect to the groove 67 of the lower portion 58 of the main rubber element 50. The groove 63 of the main rubber element 50 is annular and extends around the lower portion 58 of the main rubber element 50.

The lower portion 58 of the main rubber element 50 further includes a generally axially extending protrusion 64 abutting both the upper housing 103 and the lower housing 104. The lower housing 104 includes a protrusion 106 abutting the protrusion 64 and fitting within the annular groove 68. Annular protrusion 66 of the lower portion 58 abuts the protrusion 106 of the lower housing 104, a top plate of the inertia track assembly 124, and defines the lower section of the upper chamber 102. The lower housing further includes a flange 99 abutting the protrusion 64 operable to improve sealing characteristics.

The upper chamber 102 is defined by the inner walls 70, 72 of the intermediate portion 56 and lower portion 58 of the main rubber element 50. The lower chamber 101 is defined by the open space between various inertia track elements 112, 114 and the bellows 116. The inertia track assembly includes the inertia track 114, decoupler 112, top plate of inertia track assembly 122, 124 and bottom plate of inertia track assembly 138, 136. The inertia track assembly 138, 136 is a one piece assembly.

The upper chamber 102 and the lower chamber 101 are in fluid communication with one another by means of the inertia track 114 and the decoupler 112. Fluid in the inertia track 108, 114 is the feature which produces high damping characteristics. As the top of the hydraulic engine mount 100 (including the stud 82, the threaded aperture 80, and the main rubber element 50) moves due to engine vibration, the inertia track 114 pumps the fluid back and forth from the upper chamber 102 through the inertia track 114 to the lower chamber 101. The fluid in the inertia track 114 moves out of phase with the fluid in the upper chamber 102 causing the pressure to build up in the walls of the upper chamber 102 which increases the stiffness (and damping) of the hydraulic engine mount 100.

When the top of the hydraulic engine mount 100 is moved due to large amplitude excitation of the engine, the fluid in the inertia track 114 is pumped back and forth from the upper chamber 102 to the lower chamber 101 through the inertia track 114. The inertia track 114 provides an opening allowing fluid from lower chamber 101 into upper chamber 102. The inertial track 114 further includes a second opening allowing fluid to leave upper chamber 102 and enter lower chamber 101. The size of the inertia track 114 is tuned so that the fluid in the inertia track 114 will provide maximum damping at a particular frequency determined by the application.

The decoupler 112 is a rubber disk captured between the top plate of the inertia track assembly 124 and the bottom plate of the inertia track assembly 138. The decoupler 112 provides compliance as the fluid in the upper chamber acts upon the inertia track 114 and the decoupler 112 thereby preventing pressure from building up on the walls of the lower portion 58 and the intermediate portion 56 of the main rubber element 50, thereby assuring a low mount stiffness. A highly elastic rubber, along with a decoupler 112, contributes to good isolation characteristics. The decoupler 112 is a rubber disk that is captured between the top and bottom inertia track planes. The decoupler 112 provides compliance as the fluid in the upper chamber 40 acts upon it, thus keeping the pressure from building up in the walls of the main rubber element, keeping the mount stiffness low.

It is also to be understood that, although the foregoing description and drawings describe and illustrate in detail working embodiments of the present invention, to those skilled in the art to which the present invention relates, the present disclosure will suggest many modifications and embodiments. The present invention, therefore, is intended to be limited only by the scope of the appended claims and applicable prior art.

We claim:

1. A hydraulic engine mount assembly, the hydraulic engine mount assembly comprising: a housing having an upper housing and a lower housing;
   a main rubber element having an upper portion, the upper portion molded to a core;
   an intermediate portion forming an upper chamber, the intermediate portion molded to the upper portion, the intermediate portion extending to an annular interlocking seal portion defining a lower portion;
   the interlocking seal portion defined by an upper surface and a lower surface, the upper surface including a protrusion operable to connect with the upper housing, the lower surface including an annular groove operable to connect to the lower housing; and
   the upper housing having an annular groove to connect to the protrusion of the interlocking seal, the lower housing further including a protrusion to connect to the annular groove of the interlocking seal.

2. The hydraulic engine mount assembly of claim 1, wherein the annular interlocking seal of the lower portion of the main rubber element further including at least one annular groove.

3. The hydraulic engine mount assembly of claim 2, wherein the housing includes at least one annular protrusion operable to connect with the at least one annular groove.

4. The hydraulic engine mount assembly of claim 1, wherein the annular interlocking seal of the lower portion of the main rubber element further includes at least one annular protrusion.

5. The hydraulic engine mount assembly of claim 4, wherein the housing includes at least one annular groove operable to connect with the at least one annular protrusion.

6. The hydraulic engine mount assembly of claim 1, wherein the core includes a threaded aperture operable to accept a corresponding threaded element.

7. The hydraulic engine mount assembly of claim 1, wherein the upper portion, the intermediate portion, the lower portion and the interlocking seal are molded in a one piece construction.

8. The hydraulic engine mount assembly of claim 1, wherein the main rubber element further includes a sealing bead.

9. The hydraulic engine mount assembly of claim 8, wherein the sealing bead of the main rubber element is an annular protrusion.

10. The hydraulic engine mount assembly of claim 1, wherein the intermediate portion has an inner wall.

11. The hydraulic engine mount assembly of claim 10, wherein the inner wall of the intermediate chamber defines the upper chamber.

12. The hydraulic engine mount assembly of claim 11, wherein the engine mount assembly further includes an inertia track.

13. The hydraulic engine mount assembly of claim 12, wherein the engine mount assembly further includes a decoupler disposed adjacent to the inertia track.

14. The hydraulic engine mount assembly of claim 12, wherein the engine mount assembly further includes a bellow.

15. The hydraulic engine mount assembly of claim 14, wherein the bellow is a flexible membrane.

16. The hydraulic engine mount assembly of claim 14, wherein a lower chamber is defined as an open space between the bellow and the inertia track.

* * * * *